Oct. 6, 1964     R. N. QUENNEVILLE     3,151,669
COOLING SYSTEM FOR ROTATING MEMBERS
Filed Oct. 19, 1959
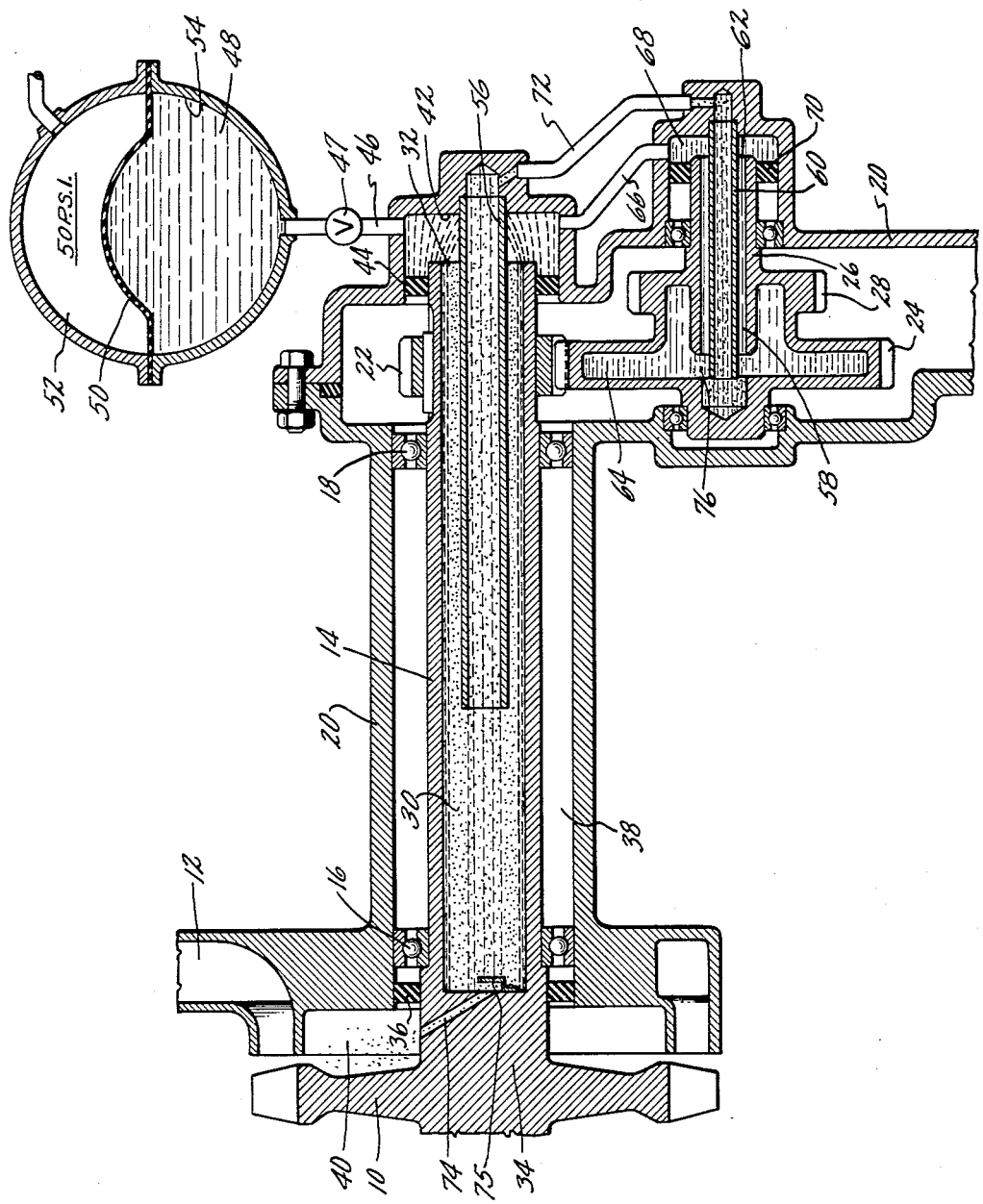
INVENTOR
RAYMOND N. QUENNEVILLE
BY   *Harris G. Luther*
ATTORNEY //  
United States Patent Office 3,151,669  
Patented Oct. 6, 1964

3,151,669  
COOLING SYSTEM FOR ROTATING MEMBERS  
Raymond N. Quenneville, Holyoke, Mass., assignor to United Aircraft Corporation, East Hartford, Conn., a corporation of Delaware  
Filed Oct. 19, 1959, Ser. No. 847,331  
11 Claims. (Cl. 165—86)

This invention relates to a cooling system and particularly to a cooling system for rotating members.

An object of this invention is a cooling system utilizing a liquid which may be evaporated to extract heat and having means automatically replenishing the liquid and also maintaining the liquid in contact with the surfaces to be cooled.

Another object is a cooling system suitable for operation in a low or zero gravity field.

Still another object is a cooling system utilizing centrifugal force for maintaining the cooling liquid in contact with the surface to be cooled and separating the vapor from the liquid.

Other and additional objects will be apparent from the following specification and the accompanying drawings in which:

The figure is a longitudinal sectional view of a portion of power producing mechanism incorporating the present invention.

In devices such as auxiliary power units and particularly those which must be designed for high output with low weight, provision must usually be made for dissipating heat developed in the mechanism. This heat dissipating means or cooling system usually requires an oil-circulating system and a heat exchanger to dissipate the heat absorbed by the oil. Both an oil cooling system and a heat exchanger present many problems when operation is required in a low or zero gravity field.

The present invention utilizes centrifugal force and a pressure so that it is substantially free from the effects of gravity. In cooling a shaft, for instance, the shaft is made hollow and a cooling fluid such as water is introduced into the hollow shaft. Rotation of the shaft will cause the water to be forced outwardly against the shaft interior and a core of less dense material will form near the axis of rotation. This less dense material is usually a vapor or it may be steam when water is used as the cooling medium. A pressurized reservoir of water is connected with the interior of the shaft, preferably through one end, so that a pressure gradient is produced which will balance the pressure produced by the centrifugal force inside the shaft and maintain a predetermined water level in the shaft. The center of the shaft is vented to allow the escape of steam or low-density material to thus carry away the heat from the shaft as the water is changed to steam, the water adjacent the shaft interior being continuously replaced by the cooler, more dense water fed thereto from the reservoir as the thickness of the water layer is reduced by water evaporation or boiling.

In the specific embodiment chosen to illustrate this invention, a turbine 10 is driven by hot gases introduced into an annulus 12 and discharged onto the turbine vanes or buckets. The turbine 10 is mounted on a shaft 14 supported on bearings 16 and 18 in a housing 20. A gear 22 carried by the shaft 14 meshes with a gear 24 on a jackshaft 26 which may also carry a gear 28 adapted to mesh with other gears, not shown, connected to the power output of the system. The turbine may thus be used to drive any suitable power-absorbing mechanism such as a generator, not shown. The shaft 14 is made hollow and has a bore or cavity 30 extending inwardly from the open end 32 to the closed end 34 of the shaft. A seal 36 adjacent the turbine separates the shaft bearings and the housing interior 38 from the turbine exhaust in the space 40 between the turbine and the housing 20. The open end 32 of the shaft 14 terminates in a chamber 42 formed in the housing 20. A seal 44 separates the chamber 42 from the shaft bearings and the interior 38 of the housing 20. A conduit 46 having a valve 47 therein connects chamber 42 with a reservoir 48 having a diaphragm 50 extending thereacross. A gas such as nitrogen under pressure is confined in the chamber 52 formed in the reservoir on one side of the diaphragm 50 and water is contained in the chamber 54 formed on the other side of diaphragm 50. A stationary pipe 56 extends into the cavity 30 in the shaft 14 through the open end 32 of the shaft and is secured to the portion of the housing 20 forming one side of the chamber 42.

A jackshaft 26 is similar to the shaft 14 and includes the bore or cavity 58 into which a stationary pipe 60 extends through the open end 62 of the shaft 26. The gear 24 is made hollow to provide the chamber 64 which connects with the cavity or bore 58 in the shaft 26. A conduit 66 connects chamber 42 with a chamber 68 formed in the housing 20 at the open end 62 of the shaft 26. The seal 70 separates the chamber 68 from the interior 38 of the housing 20. The pressurized water in the chamber 48 is forced down through conduit 46, chamber 42, conduit 66 and into chamber 68 and thence along the bore 58 outside of the pipe 60 and into the cavity 64 in the gear 24. Water forced through the conduit 46 into chamber 42 will likewise be forced into the bore 30 of the shaft 14. A pipe 72 connects the interior of pipe 60 with the interior of pipe 56 so that light-density fluid may be forced out through pipe 60 and pipe 72 and pipe 56 into the interior 30 of rotating shaft 14. Rotation of the shafts 14 and 26 and the gear 24 will force the water out against the interior surfaces of the shafts and the gear by the action of centrifugal force. A conduit 74, having its entrance protected by a baffle 75 secured to and rotatable with shaft 14, opens into the chamber 30 at or adjacent to the axis of rotation of the shaft 14 and leads to the exterior of the shaft and will vent steam or low-density cooling medium from the core of low-density material in the cavity 30.

It will thus be seen that the water pressurized by nitrogen gas is fed from the reservoir 48 under pressure directly into the chamber 42 at the end of the rotor shaft. This water flows into the rotating rotor shaft but cannot completely fill the shaft due to the dynamic force produced on the water as it rotates at rotor speed. The dynamic head thus created will balance the pressure, say 50 p.s.i., on the water in the reservoir. As the level or the thickness of the layer of the water in the rotor shaft decreases due to boiling, the steam being vented through the hole or conduit 74, the dynamic force on the water decreases, thus allowing more water to flow into the shaft from the reservoir to maintain the level of the water or the thickness of the water layer in the rotor shaft. The dynamic head will be a function of the depth of water in the rotating shaft so that as the water depth tends to decrease by reason of its having been converted into steam, it will be replaced by water from the reservoir so as to maintain substantially the same dynamic head as the static head in the reservoir. The temperature of the water in the shaft may be controlled by controlling the pressure in the chamber to which the steam is allowed to escape. In the device shown, the steam escapes through the turbine exhaust where the pressure may be in the range of 1 to 15 p.s.i.

The gears are cooled by circulating water from the chamber 42 through conduit 66 and back through the pipe 72. The pressure difference between the fluid in the conduit 66 and the fluid in the pipe 72 is essentially the inlet pressure, i.e., 50 p.s.i., since the pressure in the pipe 66 is equal to the reservoir pressure and the pressure in the pipe 72 is substantially equal to the pressure in the vent 74. Water entering the gear shaft 26 at the open end 62 passes down the shaft to the passage 76 and out into the hollow gear. The cool water entering the gear (since it is heavier than the warm water in the gear) will move out to the largest possible radius and the hot water will be forced to the center of the shaft by the dynamic force on the water. If any steam is formed in the gear, it will move to the center of the shaft and will pass along with the hot water through the pipe 60 back to pipe 72 and pipe 56 and into rotor shaft 14. Since the water and steam will be separated by the rotor shaft acting as a centrifuge, the steam will pass out of the vent 74 and any excess water will be returned to the system.

The seals 46 and 70 operate under essentially zero-pressure differences since the gearbox is pressurized by the same pressurizing nitrogen gas as used in chamber 52 of the reservoir 48 for pressurizing the water.

Although only one embodiment of this invention has been illustrated and described herein, it is to be understood that the invention is not limited to the construction so illustrated and described but that changes and variations in the arrangement of parts may be made without deviating from the scope of the appended claims.

I claim:

1. In combination, a rotatable heat transfer member, having a hollow interior for receiving a vaporizable cooling liquid, said member subject to heating to vaporize said liquid, a source of pressurized vaporizable cooling liquid, means introducing said liquid into said hollow interior including means connecting said source with the periphery of said hollow interior, means for rotating said member and introduced liquid to, under the influence of centrifugal force, separate said introduced liquid and its vapor and arrange said introduced liquid as a layer on the periphery of said hollow interior surrounding a core of said vapor means preventing the escape of said liquid layer, vent means for said vapor spaced radially inward from said periphery, the dynamic head of said layer due to centrifugal force balancing the pressure of said source so that said layer will be maintained and loss due to vaporization will be replenished.

2. Means as claimed in claim 1 including a vent connecting the interior of said member at its rotational axis with the exterior of said member.

3. Means as claimed in claim 2 including a stationary axially positioned pipe extending along the axis into said interior, said connecting means including means introducing fluid between said pipe and the boundary surface of said interior.

4. A pair of hollow rotatable shafts rotatable on separate spaced axes having separate axes of rotation, means for rotating said shafts, means leading fluid under pressure into the interior of said shafts, a vent connecting the region adjacent the axis of one shaft with the exterior of said shaft, and conduit means connecting the region adjacent the axis of the other shaft with said region of said one shaft, and means regulating the dynamic head of fluid in said shafts to regulate the quantity of fluid maintained therein by balancing said head against said pressure.

5. A system for cooling a hollow rotating member open at one end, and having means for rotating said member comprising a chamber enclosing said open end, said open end terminating in said chamber means introducing cooling fluid under pressure into said chamber and into said open end of said rotating member, rotation of said member rotating said fluid and producing a pressure gradient in the rotating fluid, means venting the lower pressure portions of said rotating fluid.

6. A system as claimed in claim 5 including a pipe extending into said chamber and said open end and forming, with said rotating member, an annulus for introducing fluid from said chamber into said member.

7. A system as claimed in claim 6 in which said pipe is stationary.

8. A system for cooling hollow rotating members rotatable on separate axes and having means for rotating said members comprising a fixed chamber connecting with the periphery of the hollow interior of said rotating members, means introducing cooling fluid under pressure into said chamber and into said interiors, means spaced radially inward from the periphery of the surface of the interior of one of said members venting said one member and means spaced radially inward from the periphery of the surface of the other member venting the other of said members into the interior of said one member.

9. A system as claimed in claim 8 in which said second-mentioned venting means comprises pipes extending axially into said interiors, and conduit means connecting said pipes.

10. A system as claimed in claim 8 in which said one member rotates faster than the other of said members.

11. A system for cooling a rotating heat-transfer surface having an axis of rotation and liquid-retaining means, means for rotating said surface, a fixed chamber surrounding the axis of rotation of said surface, a liquid-transfer connection between said surface and said chamber, means introducing cooling liquid under pressure into said chamber and through said connection onto said surface, rotation of said surface rotating the liquid introduced onto said surface and thereby producing a layer of liquid, a core for vapor and pressure in said rotating liquid equal to the pressure of the liquid introduced into said chamber and vent means spaced radially inward from said surface and venting only said core.

References Cited in the file of this patent

UNITED STATES PATENTS 2,557,649   Gerstenberg _____ June 19, 1951

FOREIGN PATENTS 368,318   France _____ July 24, 1906